(12) United States Patent
Chen et al.

(10) Patent No.: US 12,348,873 B2
(45) Date of Patent: Jul. 1, 2025

(54) METHOD FOR CONTROLLING SHOOTING PARAMETERS OF CAMERA AND TRACKING DEVICE

(71) Applicant: HTC Corporation, Taoyuan (TW)

(72) Inventors: Yuan-Tung Chen, Taoyuan (TW); Jyun-Jhong Lin, Taoyuan (TW); Chih Chien Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/395,648

(22) Filed: Dec. 25, 2023

(65) Prior Publication Data
US 2024/0129634 A1    Apr. 18, 2024

Related U.S. Application Data

(62) Division of application No. 17/506,696, filed on Oct. 21, 2021, now abandoned.

(60) Provisional application No. 63/145,497, filed on Feb. 4, 2021, provisional application No. 63/105,366, filed on Oct. 26, 2020.

(51) Int. Cl.
*H04N 23/695* (2023.01)
*H04N 23/56* (2023.01)
*G02B 27/01* (2006.01)

(52) U.S. Cl.
CPC ........... *H04N 23/695* (2023.01); *H04N 23/56* (2023.01); *G02B 2027/0138* (2013.01); *G02B 27/0172* (2013.01); *G02B 2027/0192* (2013.01)

(58) Field of Classification Search
CPC ...... H04N 23/695; H04N 23/56; H04N 23/72; H04N 23/61; H04N 23/73; G02B 27/0172; G02B 2027/0138; G02B 2027/0192
See application file for complete search history.

(56) References Cited

U.S. PATENT DOCUMENTS

| | | | |
|---|---|---|---|
| 2012/0081566 A1* | 4/2012 | Cote | H04N 25/683 348/222.1 |
| 2017/0366805 A1* | 12/2017 | Sevostianov | H04N 13/398 |
| 2019/0318501 A1* | 10/2019 | Balan | A63F 13/212 |
| 2021/0208673 A1* | 7/2021 | Forster | G06V 40/107 |

FOREIGN PATENT DOCUMENTS

JP    2012226513 A  * 11/2012  ............... G06T 7/73

OTHER PUBLICATIONS

JP 2012226513 A (Year: 2011).*
NPL Yu ("DS-SLAM: A Semantic Visual SLAM . . . ," IEEE:2018) (Year: 2018).*

* cited by examiner

*Primary Examiner* — Shadan E Haghani
(74) *Attorney, Agent, or Firm* — JCIPRNET

(57) ABSTRACT

The embodiments of the disclosure provide a method for dynamically controlling shooting parameters of a camera and a tracking device. The method includes: determining a plurality of time frames, wherein the time frames include a plurality of first time frames and a plurality of second time frames; controlling the camera of the tracking device to shoot a first image with a first exposure parameter in each of the first time frames and accordingly performing an environment detection; controlling the camera of the tracking device to shoot a second image with a second exposure parameter in each of the second time frames and accordingly performing a first specific detection, wherein the second exposure parameter is lower than the first exposure parameter.

12 Claims, 5 Drawing Sheets

METHOD FOR CONTROLLING SHOOTING PARAMETERS OF CAMERA AND TRACKING DEVICE

CROSS-REFERENCE TO RELATED APPLICATION

This application is a divisional application of and claims the priority benefit of U.S. application Ser. No. 17/506,696, filed on Oct. 21, 2021, which claims the priority benefit of U.S. Provisional Application No. 63/105,366, filed on Oct. 26, 2020, and U.S. Provisional Application No. 63/145,497, filed on Feb. 4, 2021. The entirety of each of the above-mentioned patent applications is hereby incorporated by reference herein and made a part of this specification.

BACKGROUND OF THE INVENTION

1. Field of the Invention

The disclosure generally relates to tracking mechanism, in particular, to a method for dynamically controlling shooting parameters of a camera and a tracking device.

2. Description of Related Art

Nowadays, the mechanisms used for tracking objects in systems such as augmented reality (AR) system or virtual reality (VR) system generally include inside-out tracking and outside-in tracking. In the inside-out tracking mechanism, the to-be-tracked object may be disposed with light emitting elements for the camera on the head-mounted display to capture, and the pose of the to-be-tracked object may be accordingly determined.

In this case, if the shooting parameters of the camera are not properly designed, some issues may occur. For example, if the on durations of the camera and the light emitting elements are not properly designed, either unnecessary power consumption may be introduced, or the pose of the to-be-tracked object cannot be accurately determined. For another example, if the shooting parameters use for performing environment detection and object tracking are the same, either the pose of the to-be-tracked object cannot be accurately determined, or the environment cannot be accurately detected.

SUMMARY OF THE INVENTION

Accordingly, the present invention is directed to a method for dynamically controlling shooting parameters of a camera and a tracking device, which may be used to solve the above technical problem.

The embodiments of the disclosure provide a method for dynamically controlling shooting parameters of a camera. The method includes: determining a plurality of time frames, wherein the time frames comprise a plurality of first time frames and a plurality of second time frames; controlling the camera of the tracking device to shoot a first image with a first exposure parameter in each of the first time frames and accordingly performing an environment detection; controlling the camera of the tracking device to shoot a second image with a second exposure parameter in each of the second time frames and accordingly performing a first specific detection, wherein the second exposure parameter is lower than the first exposure parameter.

The embodiments of the disclosure provide a tracking device including a camera and a processor. The processor is coupled to the camera and configured to perform: determining a plurality of time frames, wherein the time frames include a plurality of first time frames and a plurality of second time frames; controlling the camera of the tracking device to shoot a first image with a first exposure parameter in each of the first time frames and accordingly performing an environment detection; controlling the camera of the tracking device to shoot a second image with a second exposure parameter in each of the second time frames and accordingly performing a first specific detection, wherein the second exposure parameter is lower than the first exposure parameter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
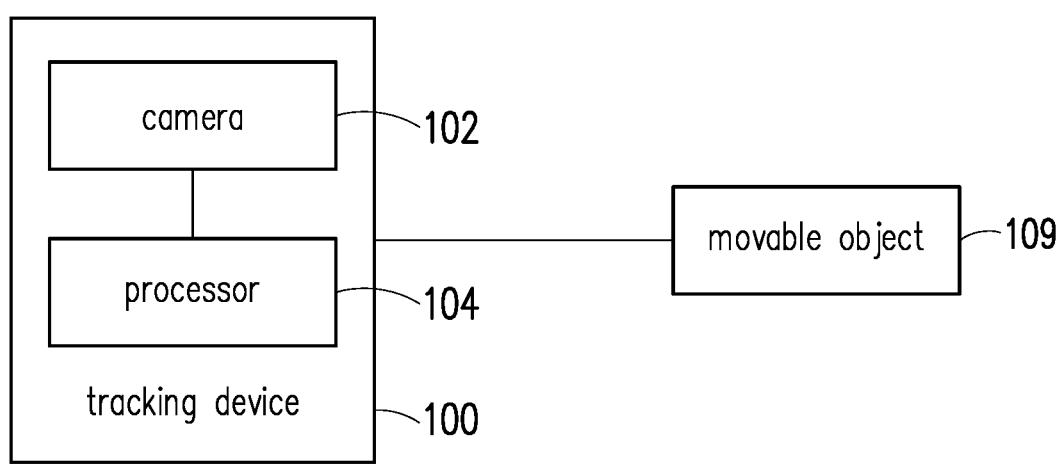
FIG. 1 shows a functional diagram of a tracking device and a movable object according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a functional diagram of a tracking device and a movable object according to an embodiment of the disclosure. In FIG. 1, the tracking device 100 may be any device capable of tracking the movable object 199 by using any known tracking mechanisms. In some embodiments, the tracking device 100 may be a head-mounted display (HMD) used in an AR system or a VR system, and the movable object 199 may be a component of the AR/VR system that needs to be tracked, such as a handheld controller, but the disclosure is not limited thereto.

In the embodiments of the disclosure, the tracking device 100 includes a camera 102 and a processor 104. In various embodiments, the camera 102 could be any cameras having charge coupled device (CCD) lens, complementary metal oxide semiconductor transistors (CMOS) lens, but the disclosure is not limited thereto.

The processor 104 is coupled to the camera 102, and may be, for example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may control the camera 102 to capture images of the movable object 199 and determine the pose of the movable object 199 accordingly. In some embodiments, the movable object 199 may be disposed with a plurality of light emitting elements (such as regular light emitting diodes (LED) and/or infrared LEDs). In this case, the processor 104 may perform inside-out tracking based on the light distributions of the light emitting elements in the images captured by the camera 102.

In the embodiments of the disclosure, the camera 102 may be configured to capture images in the corresponding on durations (referred to as first on durations). That is, the camera 102 would not capture/shoot in the durations other than the first on durations. Similarly, the light emitting elements on the movable object 199 have their own on durations (referred to as second on durations). In this case, the light emitting elements would not emit light in the durations other than the second on durations.

In the embodiments of the disclosure, the first on durations and the second on durations need to (partially) overlap with each other for the camera 102 to capture the lights of the light emitting elements. However, if the first on durations and the second on durations are not properly designed, some undesired effects may be introduced.

Figure 2A:
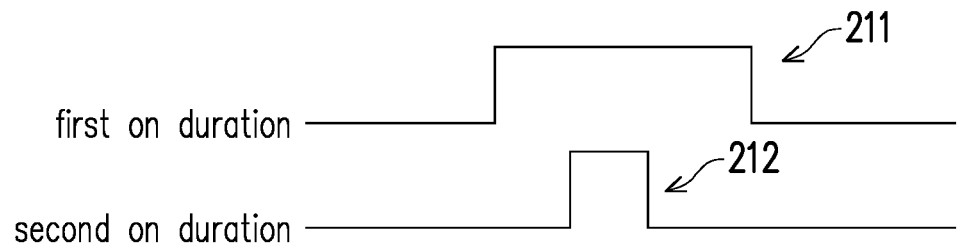
FIG. 2A shows a first combination of the first on duration and the second on duration according to an embodiment of the disclosure.

See FIG. 2A, which shows a first combination of the first on duration and the second on duration according to an embodiment of the disclosure. In FIG. 2A, the first on duration 211 is longer than the second on duration 212. In this case, the long exposure resulted from the first on duration 211 would brighten the background in the captured images, such that the objects needless to be tracked would also be captured in the images. Accordingly, the performance of tracking the movable object 199 would be degraded. In addition, since the exposure duration of the camera 102 is usually very short, it is difficult to precisely control the light emitting elements to emit lights in the second on duration 212.

Figure 2B:
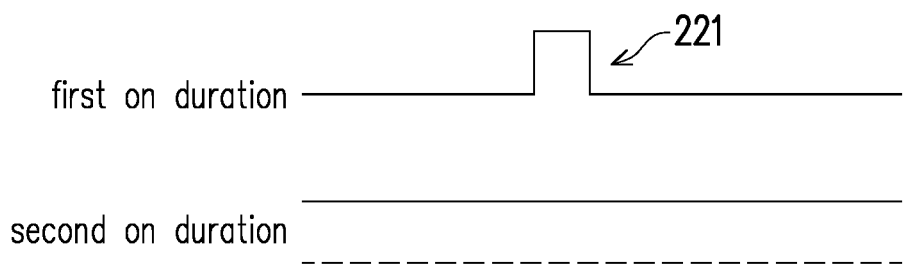
FIG. 2B shows a second combination of the first on duration and the second on duration according to an embodiment of the disclosure.

See FIG. 2B, which shows a second combination of the first on duration and the second on duration according to an embodiment of the disclosure. In FIG. 2B, the light emitting elements on the movable object 199 are designed to be always on. In this case, the first on duration 221 may be designed to be short, which prevents the background in the captured images from being unnecessarily brightened. However, the power consumption of the light emitting elements would be high.

To solve the above problem, the embodiments of the disclosure provide a method for tracking the movable object, and detailed discussion would be provided in the following.

Figure 3:
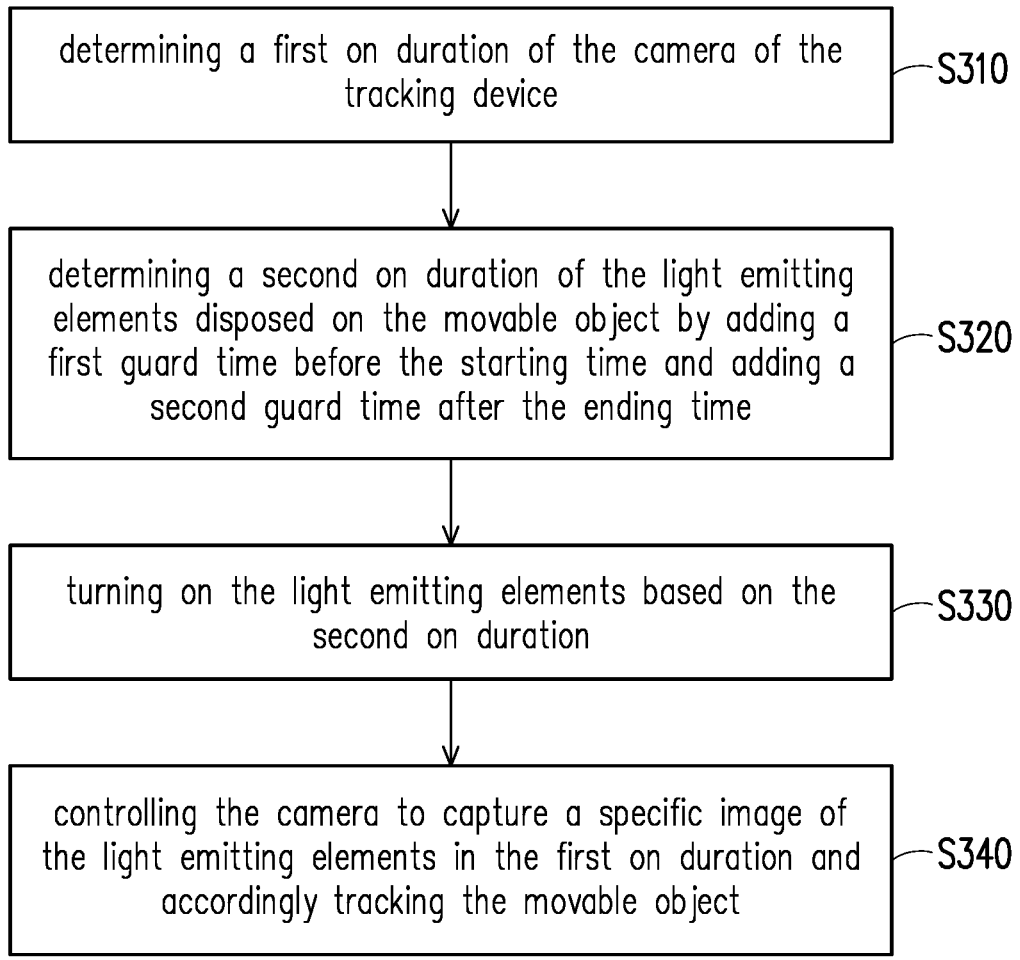
FIG. 3 shows a flow chart of the method for tracking the movable object according to an embodiment of the disclosure.
Figure 4:
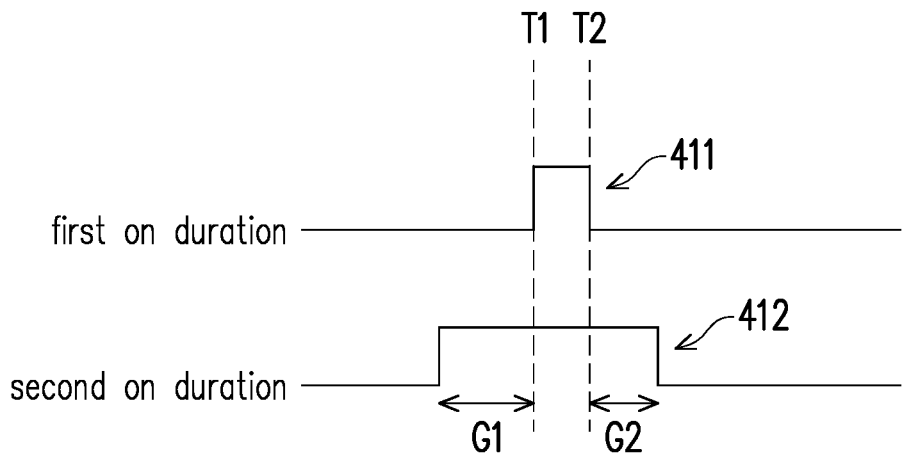
FIG. 4 shows a third combination of the first on duration and the second on duration according to an embodiment of the disclosure.

See FIG. 3, which shows a flow chart of the method for tracking the movable object according to an embodiment of the disclosure. The method of this embodiment may be executed by the tracking device 100 in FIG. 1, and the details of each step in FIG. 3 will be described below with the components shown in FIG. 1. For better understanding the concept of the disclosure, FIG. 4 would be used as an example, wherein FIG. 4 shows a third combination of the first on duration and the second on duration according to an embodiment of the disclosure.

In step S310, the processor 104 determines a first on duration 411 of the camera 102 of the tracking device 100. In the embodiment, the processor 104 may determine the first on duration 411 to a length that would not be too long to overly brighten the background in the captured images, e.g., 16 μs, but the disclosure is not limited thereto. In FIG. 4, the first on duration 411 has a starting time T1 and an ending time T2.

In step S320, the processor 104 determines a second on duration 412 of the light emitting elements disposed on the movable object 199 by adding a first guard time G1 before the starting time T1 and adding a second guard time G2 after the ending time T2. In various embodiments, the lengths of the first guard time G1 and the second guard time G2 may be arbitrarily chosen based on the requirements of the designer.

Next, in step S330, the processor 104 turns on the light emitting elements based on the second on duration 412. In one embodiment, if the light emitting elements on the movable object 199 can be independently controlled, the processor 104 can directly or indirectly control the light emitting elements to emit lights in the second on duration 412. In one embodiment, if the light emitting elements are powered and controlled by the movable object 199, the processor 104 may control the movable object 199 to turn on the light emitting elements in the second on duration 412 for emitting lights during the second on duration 412.

In one embodiment, the processor 104 may synchronize with the movable object 199 and/or the light emitting elements to notify that the light emitting elements should be turned on in the second on duration 412.

In step S340, the processor 104 controls the camera 102 to capture a specific image of the light emitting elements in the first on duration 411 and accordingly tracking the movable object 199.

In one embodiment, the processor 104 may determine the pose of the movable object 199 based on the light distribution of the light emitting elements in the specific image by using the inside-out tracking mechanism, but the disclosure is not limited thereto.

Unlike the scenario in FIG. 2A, since the second on duration 412 is longer than the first on duration 411, it would be easier to control the light emitting elements to emit light in the second on duration 412. In addition, compared with FIG. 2B, the power consumption of FIG. 4 would be much lower, which improves the battery life of the movable object 199 and/or the light emitting elements.

In addition, as mentioned in the above, if the shooting parameters use for performing environment detection and object tracking are the same, either the pose of the to-be-tracked object cannot be accurately determined, or the environment cannot be accurately detected. Therefore, the disclosure further proposes a method for dynamically controlling shooting parameters of a camera, which may be used to solve this problem.

Figure 5:
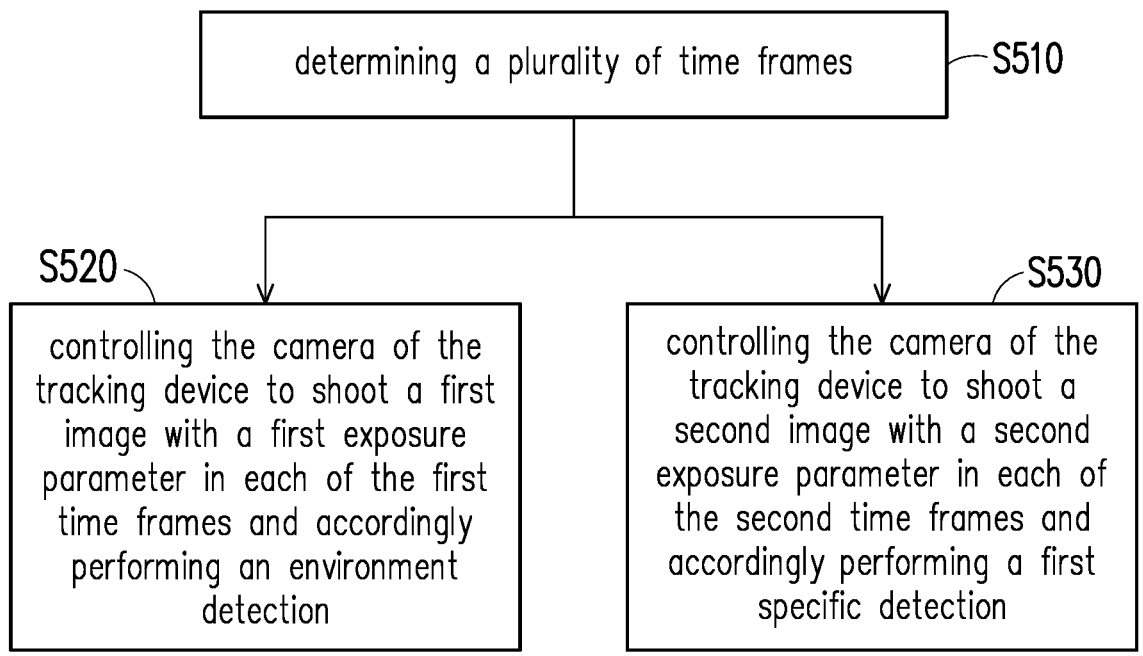
FIG. 5 shows a flow chart of the method for dynamically controlling shooting parameters of a camera according to an embodiment of the disclosure.

See FIG. 5, which shows a flow chart of the method for dynamically controlling shooting parameters of a camera according to an embodiment of the disclosure. The method of this embodiment may be executed by the tracking device 100 in FIG. 1, and the details of each step in FIG. 5 will be described below with the components shown in FIG. 1.

In step S510, the processor 104 determines a plurality of time frames, wherein the time frames comprise a plurality of first time frames and a plurality of second time frames.

In step S520, the processor 104 controls the camera 102 of the tracking device 100 to shoot a first image with a first exposure parameter in each of the first time frames and accordingly performing an environment detection.

In step S530, the processor 104 controls the camera 102 of the tracking device 100 to shoot a second image with a second exposure parameter in each of the second time frames and accordingly performing a first specific detection, wherein the second exposure parameter is lower than the first exposure parameter.

Figure 6:
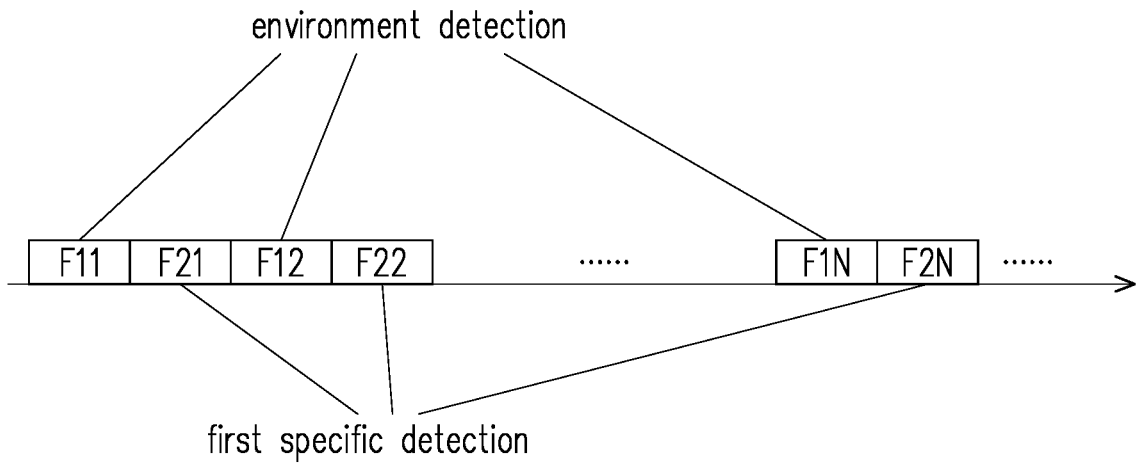
FIG. 6 shows the time frames according to a first embodiment of the disclosure.
Figure 7:
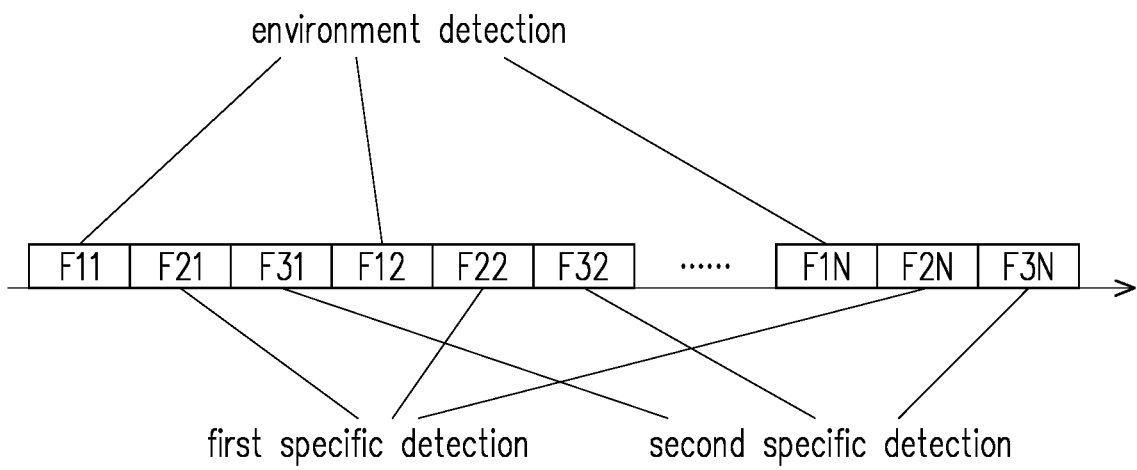
FIG. 7 shows the time frames according to the second embodiment of the disclosure.

For better understanding the concept of FIG. 5, FIG. 6 and FIG. 7 would be used as example for discussions.

See FIG. 6, which shows the time frames according to a first embodiment of the disclosure. In FIG. 6, the processor 104 may divide the time axis into a plurality of time frames, which are shown as rectangle boxes. In the present embodiment, the time frames may be divided into a plurality of first time frames F11-F1N and a plurality of second time frames F21-F2N.

In one embodiment, the first time frames F11-F1N and the second time frames F21-F2N are interleaved with each other. That is, a (2i+1)-th time frame of the time frames belongs to the first time frames F11-F1N, and a (2i+2)-th time frame of the time frames belongs to the second time frames F21-F2N, wherein i is an index.

For example, when i is 0, the (2i+1)-th time frame of the time frames may be the 1-st time frame, which would be the first time frame F11. In addition, when i is 0, the (2i+2)-th time frame of the time frames may be the 2-nd time frame, which would be the second time frame F21. For another example, when i is 1, the (2i+1)-th time frame of the time frames may be the 3-rd time frame, which would be the first time frame F12. In addition, when i is 1, the (2i+2)-th time frame of the time frames may be the 4-th time frame, which would be the second time frame F22.

In one embodiment, the processor 104 may control the camera 102 to shoot a first image with the first exposure parameter in each of the first time frames F11-F1N and accordingly performing an environment detection. In one embodiment, the processor 104 may perform the environment detection based on a simultaneous localization and mapping (SLAM) mechanism, but the disclosure is not limited thereto.

In one embodiment, the first specific detection may be used for tracking the movable object 199 disposed with the light emitting elements as taught in the above.

In one embodiment, since the processor 104 needs more feature points of the environment to better detect the environment, the processor 104 uses a higher first exposure parameter (e.g., higher exposure value and/or longer exposure time) to guarantee that the environment could be properly brightened in the first image. Accordingly, a better performance of the environment detection may be achieved in each of the first time frames F11-F1N.

On the other hand, when performing the first specific detection (e.g., tracking the movable object 199), the processor 104 can use a lower second exposure parameter (e.g., lower exposure value and/or shorter exposure time) to dim the lights from the environment in the second image, such that only the lights from the light emitting elements would be preserved in the second image. Accordingly, a better performance of the first specific detection may be achieved in each of the second time frames F21-F2N.

In a second embodiment, the time frames may further include a plurality of third time frames, and the processor 104 may control the camera 102 to shoot a third image with a third exposure parameter in each of the third time frames and accordingly performing a second specific detection, wherein the third exposure parameter is higher than the second exposure parameter, and can be equal or not equal to the first exposure parameter.

In one embodiment, the first specific detection is used for tracking the movable object 199, the second specific detection is used for the gesture detection or hand tracking.

See FIG. 7, which shows the time frames according to the second embodiment of the disclosure. In FIG. 7, the processor 104 may divide the timeline into a plurality of time frames, which are shown as rectangle boxes. In the present embodiment, the time frames may be divided into a plurality of first time frames F11-F1N, a plurality of second time frames F21-F2N, and a plurality of third time frames F31-F3N, wherein the first time frames F11-F1N, the second time frames F21-F2N, and the third time frames F31-F3N are interleaved with each other.

That is, a (3i+1)-th time frame of the time frames belongs to the first time frames F11-F1N, a (3i+2)-th time frame of the time frames belongs to the second time frames F21-F2N, a (3i+3)-th time frame of the time frames belongs to the third time frames F31-F3N, wherein i is an index.

For example, when i is 0, the (3i+1)-th time frame of the time frames may be the 1-st time frame, which would be the first time frame F11. When i is 0, the (3i+2)-th time frame of the time frames may be the 2-nd time frame, which would be the second time frame F21. When i is 0, the (3i+3)-th time frame of the time frames may be the 3-rd time frame, which would be the third time frame F31.

For another example, when i is 1, the (3i+1)-th time frame of the time frames may be the 4-th time frame, which would be the first time frame F12. When i is 1, the (3i+2)-th time frame of the time frames may be the 5-th time frame, which would be the second time frame F22. When i is 1, the (3i+3)-th time frame of the time frames may be the 6-th time frame, which would be the third time frame F32.

In one embodiment, the processor 104 may control the camera 102 to shoot a first image with the first exposure parameter in each of the first time frames F11-F1N and accordingly performing an environment detection. In one embodiment, the processor 104 may perform the environment detection based on the SLAM mechanism, but the disclosure is not limited thereto.

In one embodiment, the first specific detection may be used for tracking the movable object 199 disposed with the light emitting elements as taught in the above.

In one embodiment, since the processor 104 needs more feature points of the environment to better detect the environment, the processor 104 uses a higher first exposure parameter to guarantee that the environment could be properly brightened in the first image. Accordingly, a better performance of the environment detection may be achieved in each of the first time frames F11-F1N.

On the other hand, when performing the first specific detection (e.g., tracking the movable object 199), the processor 104 can use a lower second exposure parameter to dim the lights from the environment in the second image, such that only the lights from the light emitting elements would be preserved in the second/third image. Accordingly, a better performance of the first specific detection may be achieved in each of the second time frames F21-F2N.

In summary, the embodiments of the disclosure can add guard times before/after the first on duration of the camera of the tracking device to determine the second on duration of the light emitting elements, such that the light emitting elements can be easier controlled to emit light in the second on duration while reducing the power consumption.

In addition, the embodiments of the disclosure can use a higher first exposure parameter (e.g., higher exposure value and/or exposure time) to retrieve more feature points of the environment in the first image when performing environment detection in each of the first time frames. Accordingly, a better performance of the environment detection may be achieved in each of the first time frames.

On the other hand, the embodiments of the disclosure can use a lower second exposure parameter (e.g., lower exposure value and/or exposure time) to make sure that only the lights from the light emitting elements would be preserved in the second image. Accordingly, a better performance of the first specific detection may be achieved in each of the second time frames.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically controlling shooting parameters of a camera, adapted to a tracking device, comprising:
    determining a plurality of time frames, wherein the time frames comprise a plurality of first time frames, a plurality of second time frames, and a plurality of third time frames;
    controlling the camera of the tracking device to shoot a first image with a first exposure parameter in each of the first time frames and accordingly performing an environment detection, wherein the step of performing the environment detection comprises:
        performing the environment detection based on a simultaneous localization and mapping (SLAM) mechanism;
    controlling the camera of the tracking device to shoot a second image with a second exposure parameter in each of the second time frames and accordingly performing a first specific detection, wherein the first specific detection is used for tracking a movable object disposed with a plurality of light emitting elements, and the second exposure parameter is lower than the first exposure parameter; and
    controlling the camera of the tracking device to shoot a third image with a third exposure parameter in each of the third time frames and accordingly performing a second specific detection, wherein the third exposure parameter is higher than the second exposure parameter, wherein the second specific detection is used for a gesture detection.

2. The method according to claim 1, wherein the first time frames and the second time frames are interleaved with each other.

3. The method according to claim 1, wherein a (2i+1)-th time frame of the time frames belongs to the first time frames, a (2i+2)-th time frame of the time frames belongs to the second time frames, wherein i is an index.

4. The method according to claim 1, wherein method further comprises:
    determining a first on duration in each of the first time frames of the camera of the tracking device, wherein the first on duration comprises a starting time and an ending time;
    determining a second on duration of a plurality of light emitting elements disposed on the movable object by adding a first guard time before the starting time and adding a second guard time after the ending time;
    controlling the movable object to turn on the light emitting elements based on the second on duration; and
    controlling the camera to capture a specific image of the light emitting elements in the first on duration and accordingly tracking the movable object.

5. The method according to claim 1, wherein the first time frames, the second time frames, and the third time frames are interleaved with each other.

6. The method according to claim 1, wherein a (3i+1)-th time frame of the time frames belongs to the first time frames, a (3i+2)-th time frame of the time frames belongs to the second time frames, a (3i+3)-th time frame of the time frames belongs to the third time frames, wherein i is an index.

7. A tracking device, comprising:
    a camera; and
    a processor, coupled to the camera and configured to perform:
        determining a plurality of time frames, wherein the time frames comprise a plurality of first time frames, a plurality of second time frames, and a plurality of third time frames;
        controlling the camera of the tracking device to shoot a first image with a first exposure parameter in each of the first time frames and accordingly performing an environment detection, wherein performing an environment detection comprises:
            performing the environment detection based on a simultaneous localization and mapping (SLAM) mechanism;
        controlling the camera of the tracking device to shoot a second image with a second exposure parameter in each of the second time frames and accordingly performing a first specific detection, wherein the first specific detection is used for tracking a movable object disposed with a plurality of light emitting elements, and the second exposure parameter is lower than the first exposure parameter; and
        controlling the camera of the tracking device to shoot a third image with a third exposure parameter in each of the third time frames and accordingly performing a second specific detection, wherein the third exposure parameter is higher than the second exposure parameter, wherein the second specific detection is used for a gesture detection.

8. The tracking device according to claim 7, wherein the first time frames and the second time frames are interleaved with each other.

9. The tracking device according to claim 7, wherein a (2i+1)-th time frame of the time frames belongs to the first time frames, a (2i+2)-th time frame of the time frames belongs to the second time frames, wherein i is an index.

10. The tracking device according to claim 7, wherein the processor further performs:
    determining a first on duration in each of the first time frames of the camera of the tracking device, wherein the first on duration comprises a starting time and an ending time;
    determining a second on duration of a plurality of light emitting elements disposed on the movable object by adding a first guard time before the starting time and adding a second guard time after the ending time;
    controlling the movable object to turn on the light emitting elements based on the second on duration; and controlling the camera to capture a specific image of the light emitting elements in the first on duration and accordingly tracking the movable object.

11. The tracking device according to claim 7, wherein the first time frames, the second time frames, and the third time frames are interleaved with each other.

12. The tracking device according to claim 7, wherein a (3i+1)-th time frame of the time frames belongs to the first time frames, a (3i+2)-th time frame of the time frames belongs to the second time frames, a (3i+3)-th time frame of the time frames belongs to the third time frames, wherein i is an index.

* * * * *